United States Patent

[11] 3,547,400

| [72] | Inventor | Myron Earl Burtness |
| | | 7838 Texhoma Ave., Northridge, Calif. |
| [21] | Appl. No. | 731,923 |
| [22] | Filed | May 24, 1968 |
| [45] | Patented | Dec. 15, 1970 |

[54] DISC-LIKE VALVE MEMBER MOUNTED FOR ROTATION RELATIVE TO CONNECTED VALVE STEM
7 Claims, 5 Drawing Figs.

[52] U.S. Cl. .................................................. 251/88, 251/333
[51] Int. Cl. .................................................. F16k 25/00
[50] Field of Search .......................................... 251/332, 333, 324; 277/206.1, 187; 251/88, 84; 251/O-ring

[56] References Cited
UNITED STATES PATENTS

| 2,257,212 | 9/1941 | Willoughby | 251/332X |
| 2,690,939 | 10/1954 | Whaley | 277/187X |
| 2,704,650 | 3/1955 | Rand | 251/88X |
| 2,779,420 | 1/1957 | Stevenson | 277/187 |
| 2,949,928 | 8/1960 | Hobson | 251/333X |
| 3,272,218 | 9/1966 | Johnson | 251/332X |

FOREIGN PATENTS

| 9,164 | 1915 | Great Britain | 251/88 |

Primary Examiner—Arnold Rosenthal
Attorney—Spensley, Horn & Lubitz

ABSTRACT: A valve means particularly adapted for usage in situations requiring capacity for trouble free operation under conditions of infrequent use as in fire hydrant or other fire hose connections and similar situations in which a manually operated valve means is required which maintains its sealing ability and is capable readily of being caused to open and close despite infrequent usage. The illustrated embodiment of the invention is installable as a replacement for valves now employed and includes a disclike valve member mounted on a valve stem with capacity for relative rotation between the valve member and valve stem and sealed by an O-ring gasket means engaging the valve stem and another O-ring gasket member engaging the seat with which valve member cooperates. The first mentioned O-ring gasket permits the valve stem to extend entirely through the valve members, thus providing an important simplification in construction.

PATENTED DEC 15 1970
3,547,400
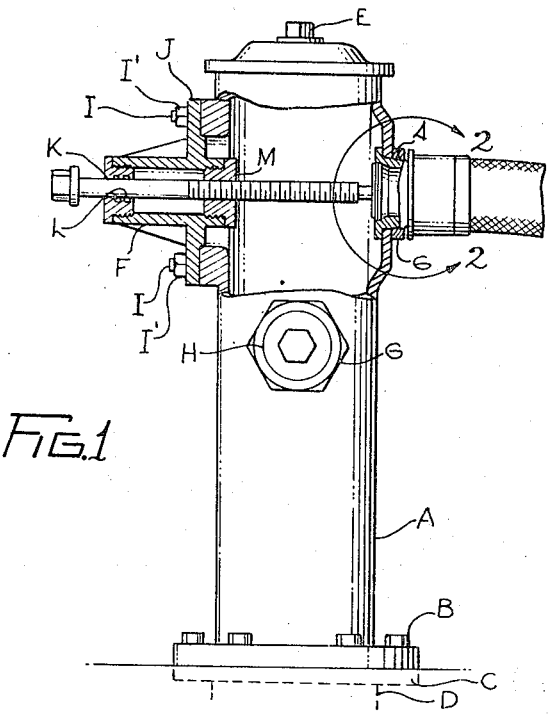
Fig.1
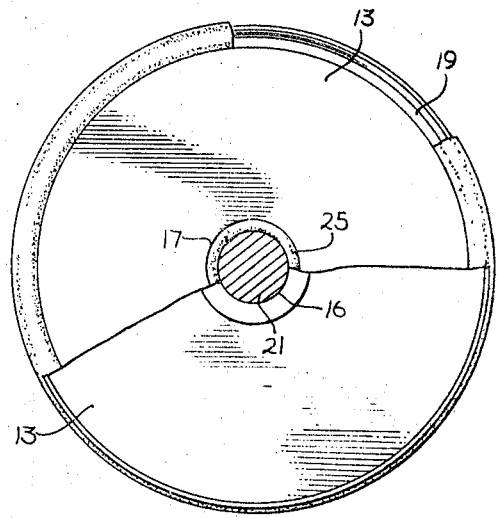
Fig.3
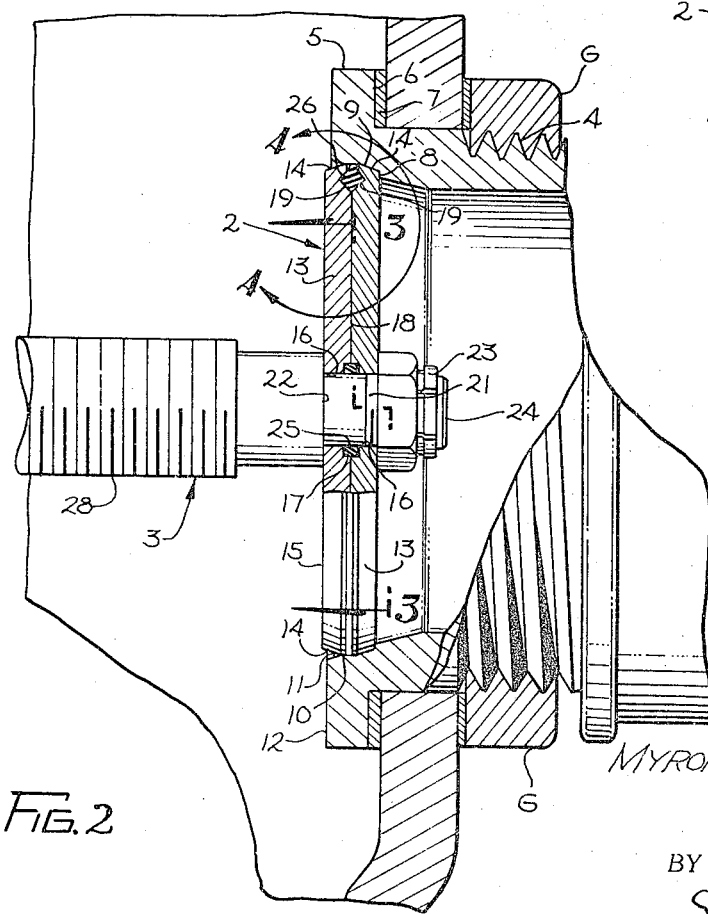
Fig.2
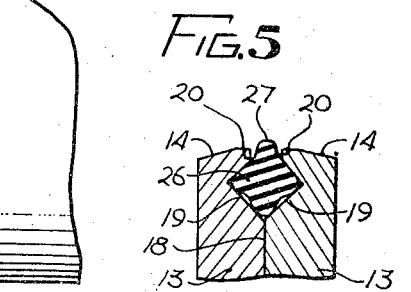
Fig.4
Fig.5
MYRON EARL BURTNESS
INVENTOR.
BY
Spencer & Horn
ATTORNEYS

3,547,400

DISC-LIKE VALVE MEMBER MOUNTED FOR ROTATION RELATIVE TO CONNECTED VALVE STEM

BACKGROUND OF THE INVENTION

1. Field of the Invention

The field of the invention is that of manually operable valves classifiable generally in Class 251, Classes 213, et seq.

2. Prior Art

A search failed to disclose a comparable valve construction.

SUMMARY OF THE INVENTION

Valves which are infrequently used such as those on fire hydrants or other fire hose connections or in any other usage in which the valve remains in closed position over long periods of time present a problem in that encrustrations of the mineral content of the water may build up on valves presently employed to an extent which renders opening of the valve a difficult and sometimes even an impossible task. The present invention recognizing these difficulties, proposes a new and novel valve member assembly movable into and out of engagement with a complementary valve seat by a manually operable screw means on which the valve member assembly is mounted with capacity for relative rotation. The valve member is made of a pair of identical metal parts which, when suitably combined, form a gasket receiving groove for a gasket mounted thereon between the operating stem and the valve member and another gasket adapted to form a seal with a valve seat. As another objective, the assembly of the valve member assembly to the operating stem serves also to hold the valve member and gasket in assembly and particularly to restrain the valve seat engaging gasket from being dragged out of its retaining groove by the force of the water passing the valve member as the valve member is being moved to or from the opened position. Other objects and advantages will appear as the description of a presently preferred embodiment of the invention proceeds.

BRIEF DESCRIPTION OF THE DRAWINGS

In the drawings which depict a presently preferred embodiment of the invention described in the specification following:

FIG. 1 is a side elevation of a typical fire hydrant partly in section and in which a valve means constituting a presently preferred embodiment of the invention is incorporated, the valve being shown in open position;

FIG. 2 is a greatly enlarged, fragmentary sectional view of the area designated by the line 2–2 of F with the valve being shown in closed position;

FIG. 3 is a sectional view taken generally in the vertical planes defined by the staggered line 3–3 of FIG. 2, certain portions being broken away for clearness of illustration;

FIG. 4 is a further enlarged fragmentary view of the seated valve as in the area defined by the line 4–4 of FIG. 3; and FIG. 5 is a view generally like FIG. 4 but showing the seating gasket configuration when the valve is unseated.

DETAILED DESCRIPTION OF THE PREFERRED EMBODIMENT

Referring to the drawings, while a presently preferred embodiment of the device is shown as applied to a fire hydrant, it will be appreciated as the description of that embodiment proceeds that the invention is capable of many other uses involving different valves for other purposes.

Specifically, there is shown a fire hydrant or "plug" comprising a hollow vertically disposed body A provided with a bottom flange B which may be bolted to a complementary flange C of a water main D. The upper end of the hydrant frame or body is closed by a screw plug E. Mounted in and extending transversely of the body is at least one valve means comprising a valve bonnet F in which a valve stem forming a component part of the present invention is threadedly engaged. The opposite wall of the body A carries a valve seat member also forming a part of the present invention, said valve seat member being exteriorly threaded for engagement by a hose coupling and said threaded portion also being engaged by a nut G which clamps the inner flange of the valve seat member against the inner surface of body A. there being suitable gaskets interposed between the adjacent surfaces of the body, the flange and the nut. The threads on the outer end of the valve seat member beyond the nut G are normally engaged by a removable cover cap H and upon removal of the cap are rendered available for connection to a hose coupling.

As best shown in FIG. 1, the bonnet F is secured to the body A by suitable studs I extending through the bonnet flange J and engaged by nuts I' and the bonnet as its outer end is provided with a guide bushing K having sealing gaskets L, L engaging the valve stem. At its inner end, the bonnet is provided with a threaded bushing M in axial alignment with the guide bushing K and which engages the threads on the valve stem as will be presently described. The foregoing description in which the parts are identified by letters relates to those portions of an existing hydrant which are unchanged incident to the installation of the present invention.

Generally, the present invention includes the valve seat member 1 which serves also as the outlet and hose connection means of the hydrant, the valve assembly 2 which moves into and out of seating engagement with the valve seat assembly and the valve stem 3 which extends through the bonnet and carries the valve assembly.

The valve seat member 1 is of generally hollow cylindrical configuration having an external threaded surface 4 engageable with complementary threads extending through the wall of the hydrant body A and at one end having an annular flange 5 including a rear face 6 operable to cooperate with an opposed wall surface of the hydrant to compress a gasket 7 therebetween to seal the joint constituting the threaded engagement with hydrant body. The nut G, as previously mentioned, serves to secure the valve seat member against becoming loose. The threaded portion 5 extends beyond the outer wall of the hydrant body A and is normally covered by the cap H but on removal of this cap, present means for attachment of a hose coupling. The valve seat portion of the member 1 considered in the order opposite the direction of fluid flow therethrough, comprises an annular stop shoulder 8 at the downstream side of the valve seat portion, a slightly outwardly tapered wall portion 9. The minor diameter of the wall portion 9 joins the outer diameter of said stop shoulder and the major diameter thereof is coincident with the downstream edge of a cylindrical wall portion 10 extending parallel to the axial line about which the valve seat surfaces are generated. The upstream edge of the wall portion 10 is coincident with the minor diameter edge of a second outwardly tapered wall portion 11 and having its larger diameter terminating at the outer or upstream surface 12 of the flange portion 5.

The valve assembly 2 comprises a pair of identical disclike body members 13, 13 each having an outer peripheral tapered surface 14 which is complementary to the inner tapered surface 9 of the valve seat member and an outer side surface 15 of such diameter as to seat on the shoulder 8 of the valve seat member. At the center thereof, each body member is provided with a bore 16 in which the complementary end of the valve stem is received, said bore having a counterbore 17 formed at the inner face 18 of the valve body member. Additionally, the inner face of the valve body member is provided with a V-shaped groove 19 disposed closely adjacent to the peripheral edge of the valve body member and the portion of the inner face of the member between said groove and the periphery is disposed below the plane of the inner face 18 as at 20 combining with the corresponding portion of the other body member 13 to afford a clearance for a gasket means to be presently described.

The valve assembly body members are disposed with their inner faces abutting and are mounted on the reduced diameter end 21 of the valve stem 3 and are secured thereon by being clamped together and against a shoulder 22 on the valve stem by a nut 23 engaging the threaded distal end 24 of the valve stem, the clamping engagement thus effected while eliminating end play between the valve stem and the valve body members 13 and 13 still permitting relative rotation between the stem and the members. When thus assembled, the two counterbores 17, 17 face each other and form an annular groove in which an O-ring gasket 25 is housed and is compressed between the bottom of the groove and the valve stem surface whereby it operates to prevent leakage through the joint between the valve members and the valve stem.

Also incident to the assembly of the members 13, 13 on the valve stem, a rings gasket 26 of elastic material is housed in the rectangular annular groove formed by the juxtaposed V-shaped grooves 19, 19, said gasket being a standard article of commerce of generally rectangular cross section with the side surfaces thereof normally disposed parallel to and normal to the axial line of the gasket. The rectangular groove formed by the two V-shaped grooves 19, 19 is of slightly less cross-sectional area than that of the gasket with the result that when the members 13, 13 are clamped together, the corner 27 of the gasket disposed at the outer edges of the members will be caused to be bulged outwardly through the clearance formed by the portions 20, 20 of said members slightly beyond the periphery of the members as best shown in FIG. 5 and, as best shown in FIG. 4, said periphery is of slightly less diameter than the straight portion 10 of the valve seat.

The valve stem 3 from a point spaced from the shoulder 22 for a distance equal to the length of the threaded bushing M plus the distance to which the valve is to be opened, is provided with a threaded portion 28 which is complementary to the threads of the bushing M and the guide bushing K is spaced outwardly a distance from the threaded bushing so that when the valve stem is moved to carry the valve assembly the maximum intended distance from the valve seat permitted by the threads, the opposite end of the threaded portion of the valve stem body will be out of contact with the gaskets L, L in the guide bushing, wherefore, leakage out of the bonnet past the valve stem is prevented.

When the valve is closed, the outermost of the members 13, 13 is seated on the shoulder 8 and the protruding corner 27 of the gasket 26 will have been caused to slide along the tapered face 11 of the seat member and will be compressed while engaging the straight wall portion 10 of the valve seat member with sufficient pressure to prevent leakage of water between the gasket and the wall surface 10, the tight engagement of the gasket by the grooves 19, 19 serving also to prevent leakage around the inner perimeter of the gasket. Any type of operating means for the valve stem may be provided. As is usual in fire hydrant use, the outer end of the valve stem may carry an end member of polygonal configuration for engagement by a suitable wrench.

The operation of the valve is believed to be obvious. When the valve is closed, as shown in FIG. 1, the thrust of the water pressure on the valve members 13, 13 is absorbed by the engagement therewith on the shoulder 8, wherefore, the gasket 25, and 26 have only the function of preventing leakage without resisting the thrust. Also since the valve stem has capacity for rotation relative to the valve assembly 2, in opening a valve which may have remained closed for a year or more, the force of moving the valve member will not involve the relative rotation thereof in the valve seat, but will involve only the endwise movement of the valve relative to the seat.

Attention is directed to the fact that this particular valve construction is formed of a very few parts all of which are simple in design and that the valve assembly 2 is formed from a pair of identical members and two gaskets which are available on the open market. Moreover, the invention is adaptable to existing fire hydrants merely by the substitution of the valve stem, the valve assembly and the valve seat member. Further, while the invention has thus been described in connection with its use on a fire hydrant, and other similar connections, with suitable adaption of the valve body, the invention is obviously readily usable in any valve situation in which a disclike valve assembly is to be moved into and out of engagement with a valve seat member and for these reasons, the invention is not to be deemed to be limited to the precise details of construction and place of use, thus described by way of example and it will be understood that the invention includes as well all such changes and modifications in the parts and in the construction, combination and arrangement of parts as shall come within the purview of the appended claims.

I claim:

1. In a valve, a hollow body having a fluid inlet and a fluid outlet and a valve means interposed between said inlet and outlet, said valve means comprising a valve seat member having an opening therethrough defined, in part, by an annular stop shoulder disposed at the side of said valve means adjacent said outlet and a cylindrical wall portion spaced from said stop shoulder in the direction of said inlet and disposed concentrically with respect to said stop shoulder and being of greater diameter than said annular stop shoulder, a valve assembly manually movable toward and away from said stop shoulder, and a rotatable valve stem carrying said valve assembly by means permitting rotation thereof relative to said valve assembly and operable by rotation thereof to move said valve assembly, said valve assembly including a first resilient gasket means defining the outermost peripheral surface of said valve assembly and operative by its resilience to effect sealing engagement with said cylindrical wall portion of said valve seat member when said valve assembly abuts said annular shoulder.

2. A valve as claimed in claim 1 in which said valve stem extends through an opening in said valve assembly and is rotatable in said opening, and in which a second resilient gasket means between said valve stem and said valve assembly in said opening is operative to prevent fluid flow between the juxtaposed surfaces of said valve stem and said valve assembly.

3. A valve as claimed in claim 1 in which said valve assembly comprises a pair of disclike plates disposed in side-by-side arrangement and each of said plates having one each of a pair of annular V-shaped grooves on the juxtaposed faces thereof, and in which said first gasket means comprises a gasket of rectangular cross section seated in the rectangular groove formed by said juxtaposed V-shaped grooves.

4. A valve as claimed in claim 1 in which said valve assembly comprises a pair of disclike plates each having an axial opening extending therethrough in which said valve stem extends through said openings in said plates, and in which complementary counterbores in the juxtaposed faces of said plate combine to form a groove in which a second gasket means is seated to from a fluid tight seal between said valve stem and said valve assembly.

5. A valve as claimed in claim 1 in which said valve stem includes a single screw threaded means operative both to secure said valve assembly on said valve stem and to secure said first gasket means in said valve assembly.

6. A valve as claimed in claim 2 in which said valve stem carries means simultaneously securing said valve assembly mounted thereon and securing said first and second gasket means in assembly with said valve assembly.

7. A valve as claimed in claim 3 in which the opposed side surface of said disclike members outwardly of said V-shaped grooves are relieved to form a peripheral slot, and in which the combined cross-sectional area of said V-shaped grooves is less than the normal cross-sectional area of said first gasket means whereby upon placing said disclike member in juxtaposition on said valve stem, said first gasket means will be compressed with resultant projection of a portion thereof radially outwardly through said peripheral slot for engagement with said cylindrical wall portion of said valve seat member.